Figure 1:
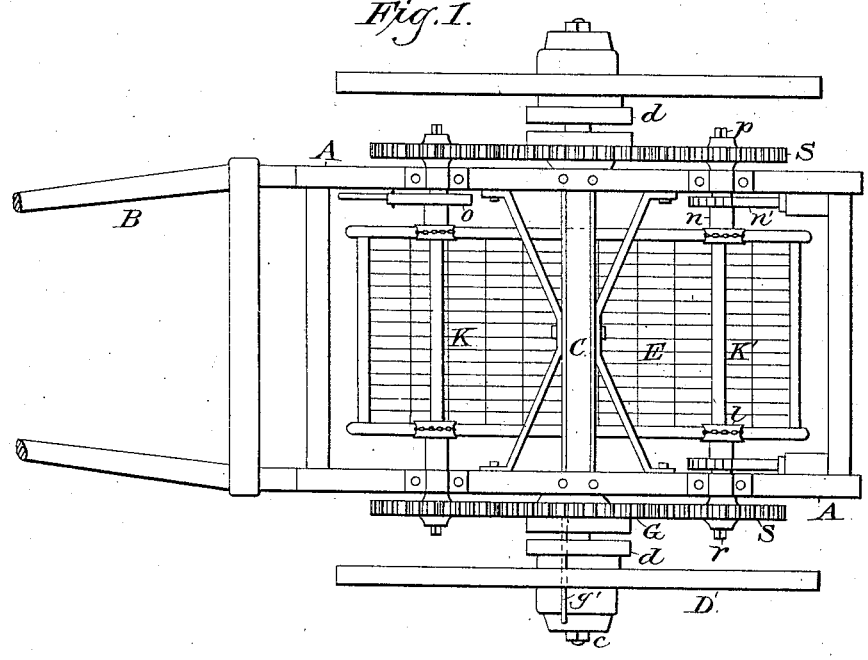

J. EVANS.
BRICK CART.

No. 103,589.  Patented May 31, 1870.

Witnesses:
Edw Brown
Jos Raby

Inventor:
Jas Evans

UNITED STATES PATENT OFFICE.

JAMES EVANS, OF PHILADELPHIA, PENNSYLVANIA.

IMPROVEMENT IN BRICK-CARTS.

Specification forming part of Letters Patent No. 103,589, dated May 31, 1870.

*To all whom it may concern:*

Be it known that I, JAMES EVANS, of the city and county of Philadelphia and State of Pennsylvania, have invented certain Improvements in Brick-Carts, of which the following is a specification.

The object of my invention is to construct a cart for carrying bricks, more especially pressed brick, so that the box containing the bricks may be raised and secured to the cart and again deposited where required for building. I accomplish this by a shaft at each end of the cart, to which the box is suspended. These shafts are geared into a cog-wheel on the cart-wheel, so that the drawing of the cart over the road winds up the box off from the ground, in which position it is retained until lowered again.

Figure 2:
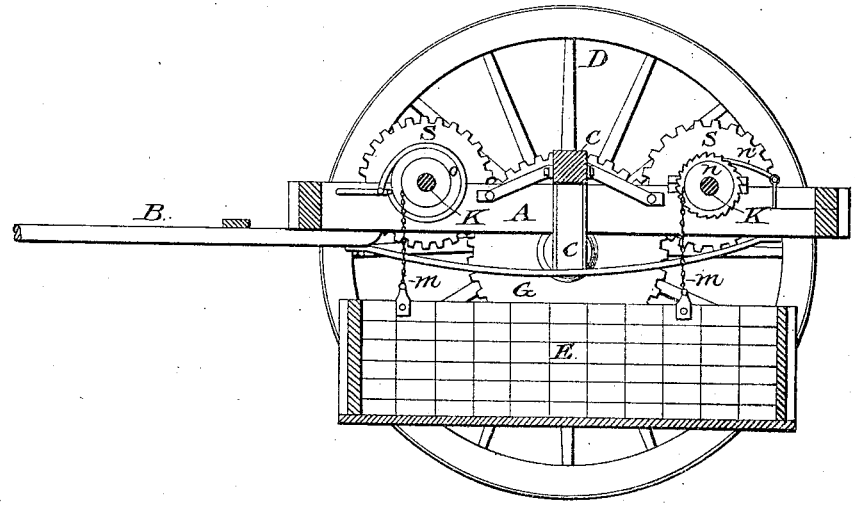

Referring to the drawings, Figure 1 is a plan of my cart. Fig. 2 is a longitudinal section.

A is the frame of the cart, having shafts B attached. C is the axle, cranked upward, passing through the wheels D, and upon which the frame A is carried. The axle C is cranked upward, so as to permit of the box E being raised sufficiently to clear the usual inequalities of the road. Upon the axle, and close to the wheel, runs a loose spur-wheel, G. Upon the hub of the wheel is a metal ring, d, having several holes drilled through it. Corresponding holes are drilled into the spur-wheel G. When the pin g' is inserted into these holes, the spur-wheel then turns with the cart-wheel. The precise mode of connecting the spur-wheel with the cart-wheel is immaterial, as a sliding clutch-box would answer the same purpose. Upon each end of the frame A is a shaft, K K', with a spur-wheel, S, at each end gearing into the spur-wheel G upon the axle. It is not essential to have the spur-gearing on each side of the cart, one side being sufficient.

Upon the shafts K K' are grooved pulleys l, to which chains m are secured, and by which the box of bricks E is raised. On the shaft K' is a ratchet-wheel, n, into which falls a pawl, n', so as to prevent the chain unwinding until released by hand. On the shaft K is a brake-wheel, O, by which the box is lowered. The ratchet-wheel n and the brake-wheel O might close together on the same shaft for greater convenience in lowering. The square shank p at each end of the shafts K K' is for raising the box by a winch, if so preferred.

The cart is used in this manner: The box E, standing in the brick shed, is filled with bricks and the cart backed over it. The chains m are secured to it, the spur-wheel G is thrown into gear, and the horse starts forward, raising up the box close to the shafts K K', the pawl n' is lowered, the spur-wheel G is disconnected, and the cart is ready for its journey.

Independent of the device here described for raising the box E, the construction of the frame A, with the cranked axle C raised above the frame, permits of the box E being raised much higher from the road than if the axle were straight, as usual. The advantage of this will be appreciated by those who know the deep ruts usually about a brick-yard.

What I claim as my invention, and desire to secure by Letters Patent, is—

1. A brick-cart constructed with the shafts K K' geared to the wheel G, so that the forward motion of the cart raises the box E into its position, as herein described.

2. A brick-cart having the frame the shafts K K', the cranked axle C, and E, combined and arranged as herein described.

JAS. EVANS.

Witnesses:
 EDW. BROWN,
 JOS. RABY.